United States Patent [19]
Shigeno et al.

[11] Patent Number: 5,247,530
[45] Date of Patent: Sep. 21, 1993

[54] LASER DIODE MODULE

[75] Inventors: Kazuo Shigeno, Tokyo; Hiroshi Ohno, Kumamoto, both of Japan

[73] Assignee: NEC Corporation, Japan

[21] Appl. No.: 786,089

[22] Filed: Oct. 31, 1991

[30] Foreign Application Priority Data

Oct. 31, 1990 [JP] Japan ................... 2-296096

[51] Int. Cl.⁵ ............................ H01S 3/02; G12B 6/42
[52] U.S. Cl. ........................................ 372/36; 385/92
[58] Field of Search ............... 385/92, 94; 372/36

[56] References Cited
U.S. PATENT DOCUMENTS 4,865,410 9/1989 Estrada et al. ................... 385/92

FOREIGN PATENT DOCUMENTS 0259018 8/1987 European Pat. Off. .
57-100781 6/1982 Japan .

Primary Examiner—James W. Davie
Attorney, Agent, or Firm—Ostrolenk, Faber, Gerb & Soffen

[57] ABSTRACT

A laser diode module in which a laser diode chip and an optical fiber pig-tail adjusted in optical axis relative to this laser diode are loaded on a package, and a ferrule provided at the tip end of the optical fiber pig-tail is fixed at the lateral wall of this package, the package and the ferrule being coupled via a bellows. The bellows absorbs a relative displacement in the axial direction of the ferrule, which is caused between the package and the ferrule by the fluctuation of the ambient temperature, thereby to prevent the optical axes of the laser diode chip and the ferrule from being misaligned.

11 Claims, 2 Drawing Sheets

LASER DIODE MODULE

BACKGROUND OF THE INVENTION

The present invention relates to a laser diode module, and more specifically to a laser diode module in which the optical axes of a laser diode and an optical fiber pig-tail are each relatively adjusted.

A laser diode (hereinafter referred to as "LD") module used in optical fiber communication is often marketed in the form of a module provided with an optical fiber pig-tail for guiding light output power and is used under an extensive range environmental conditions ranging from low to high temperatures.

FIG. 1 illustrates a longitudinal cross section of a conventional LD module. A laser diode (LD) chip 5 is adjusted in optical axis relative to a ferrule 4 via a lens 2 and the ferrule 4 is fixed to a base 1 via a slide ring 3 by YAG laser welding. An optical fiber 12 is protected at a proximate end by ferrule 4 which is a metal pipe hermetically surrounding the optical fiber 12. The base 1 is fixed to a package or container 9 by soldering, with a Peltier element 11 interleaved therebetween. The ferrule 4 is fixed to the end wall of the package 9 by a solder lib 14 in a manner to be hermetically sealed.

Since the LD module is usually used under environmental conditions that may vary from $-20°$ C. to $+70°$ C., within this range, it is required to retain a stable performance. The conventional package arranged as above expands about 60 $\mu$m in the axial direction of the fiber within the atmosphere of $+70°$ C. as compared with a case under the normal temperature (25° C.). This displacement causes mechanical movement of the ferrule 4 fixed by a solder 14. When the ferrule 4 receives such a force, the base 1 would be deformed by being pushed by the ferrule, causing a deviation of the optical axes for the LD chip 5 and the ferrule 4. As a result, the optical output power launched into the optical fiber 12 within the ferrule 4 fluctuates 1 dB or more. This phenomenon will also occur under the environmental condition of $-20°$ C., and yet in the opposite direction, thereby causing a fluctuation of the optical output power. That is, the conventional LD module has a drawback that its optical output power fluctuates by the fluctuation of the environmental temperature.

SUMMARY OF THE INVENTION

Accordingly, an object of the present invention is to eliminate the drawback discussed above and provide a laser diode module which allows a stable optical output power to be achieved even for fluctuating environmental temperature.

According to the present invention, there is provided a laser diode module comprising a package having first and second ends, a laser diode chip accommodated therein and a ferrule provided at the end of an optical fiber fixed to the laser diode chip at a predetermined optical position, the ferrule being supported near the first end of the package at its one end and, at the other end, extending through an aperture provided at the first end of the package, a bellows through which center hole the ferrule extends, and fixed to the package at its one end and fixed to the ferrule at the other end.

In a preferred embodiment of the present invention, the LD module has a base fixed to the package, and the ferrule is fixed to this base at its one end and is coupled to the package at the other end via the bellows.

In the preferred embodiment of the present invention, the ferrule may be divided into two portions so that the first portion is fixed to the base and the second portion is coupled to the package via the bellows.

That is, in the laser diode module according to the present invention, since the package and the ferrule are coupled via the bellows, even under the environmental condition ranging from the low to high temperatures, a stable optical output can be coupled without the optical axes of the laser diode and the optical fiber pig-tail being misaligned.

The present invention will be clearly understood from the following description with reference to the accompanying drawings.

DETAILED DESCRIPTION OF THE PREFERRED EMBODIMENTS

Figure 2:
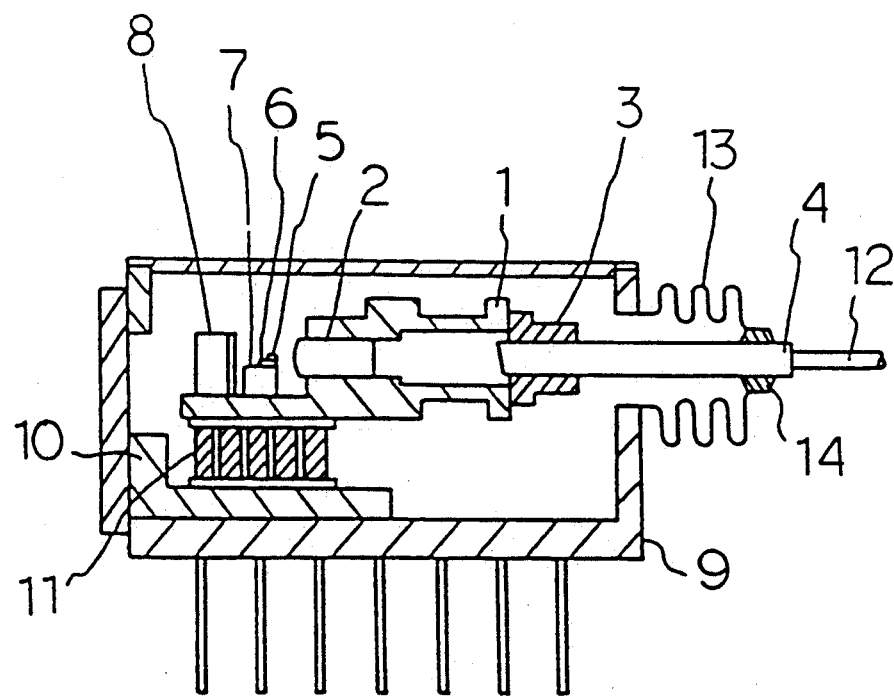
FIG. 2 is a longitudinal cross section of a laser diode module according to a first embodiment of the present invention.

FIG. 2 illustrates a longitudinal cross section of a laser diode module according to a preferred embodiment of the present invention. A base 1 supports a lens 2 at its one end and also supports optical fiber 12 at its signal coupling and that is surrounded by ferrule 4. The latter extends through slide ring 3 fixed to the base 1 by means of an YAG laser welding. In addition, the base 1 is provided with a forward extension for supporting a laser diode chip 5, a heat sink 6, a chip carrier 7 for supporting these and a photodiode 8. The LD chip 5 is adjusted in optical axis relative to the ferrule 4 via the lens 2.

The extension of the base 1 is opposed to an L-shaped member 10 of the package 9 at a predetermined interval, and a Peltier element 11 is disposed therebetween. The Peltier element 11 is fixed to the base 1 and the package 9 by means of soldering.

The ferrule 4 at the rear or tip end of the optical fiber pig-tail 12 extends outwardly of package 9 through an aperture in the rear end of the package 9. One end of the bellows 13 is fixed to package 9 about its said aperture. Bellows 13 extends coaxially with the ferrule 4, and the other end of bellows 13 is hermetically sealed to the outer peripheral surface of the ferrule 4 via a solder layer 14 at a location remote from the front or signal coupling end of optical fiber 12.

The bellows 13 is, for example, an electroplated bellows formed of a multilayer film of Au, Ni and Cu and, in this embodiment, it has three crests and its spring constant assumes 0.1 kg/mm.

If the LD module arranged as above is used under the environmental condition fluctuating between $-20°$ C. and $+70°$ C., the package 9 is deformed about 60 $\mu$m in the axial direction of the ferrule 4 due to thermal expansion/contraction. This deformation in turn causes a relative displacement corresponding thereto between the bellows 13 fixed to one end of the package and the ferrule supported to the other end of the package. This displacement is absorbed by expansion and contraction of the bellows 13. If the spring constant of the bellows is on the order of 0.1 kg/mm or less, then a mechanical stress is hardly applied to the ferrule 4 and the deformation of the package 9 is absorbed by the bellows 13. In consequence, the optical axes of the LD chip and the ferrule cannot misalign.

Figure 3:
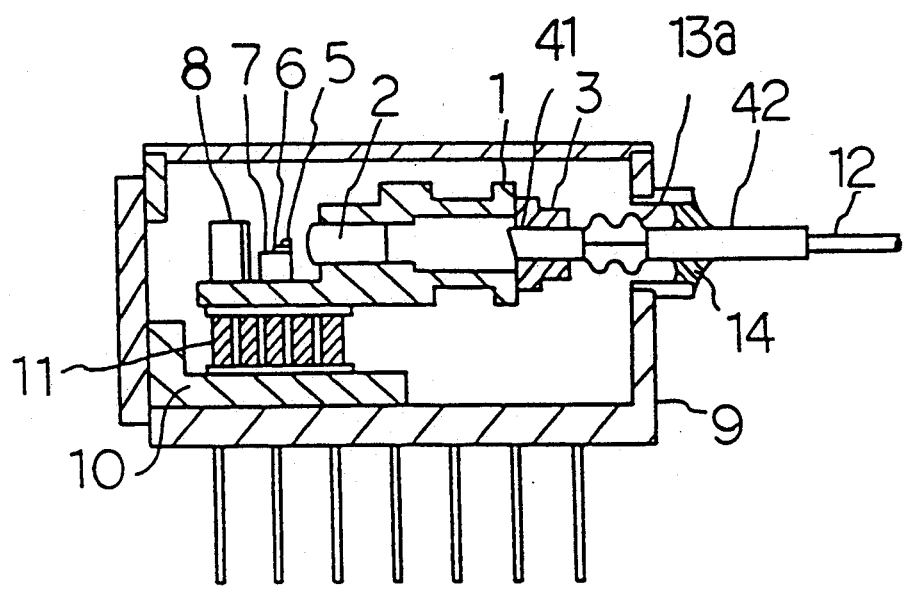
FIG. 3 is a longitudinal cross section of a laser diode module according to a second embodiment of the present invention.

FIG. 3 illustrates a longitudinal cross section of a second embodiment of the present invention. This LD module differs from that of FIG. 2 in that the ferrule 4 is divided into a first and second ferrules 41 and 42, which are both coupled by a bellows 13a. The second ferrule 42 constitutes a hermetic sealing portion of the package. The bellows 13a may be an electroplated bellows as in the foregoing but, in this embodiment, it is a single Ni layer having two crests and its spring constant assumes 0.1 kg/mm.

Figure 1:
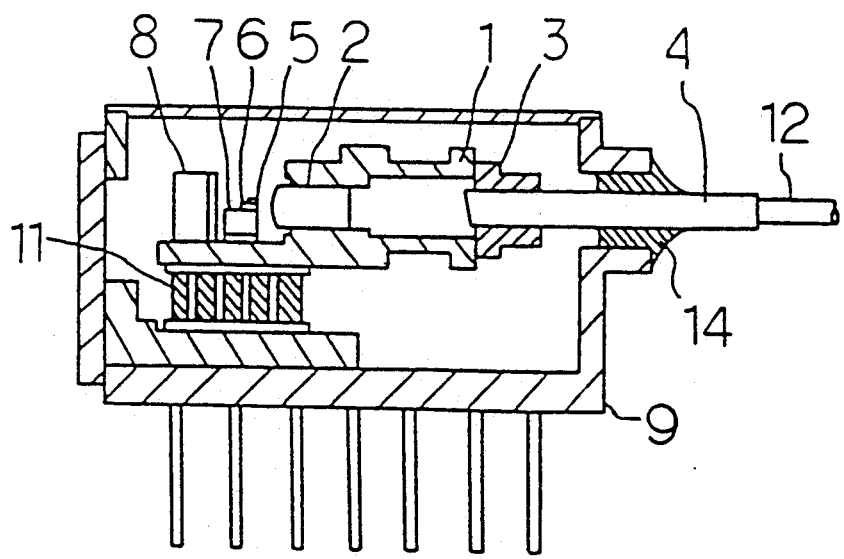
FIG. 1 is a longitudinal cross section of a conventional laser diode module.

The first ferrule 41 is adjusted in optical axis relative to the LD chip 5, and is fixed to the base 1 via the slide ring 3 by YAG laser welding, while the second ferrule 42 is fixed to the package 9 by the solder layer 14, as in the conventional LD module of FIG. 1.

In the LD module according to the second embodiment, since the ferrule is divided into two portions, the deformation within the range of −20° C. and +70° C. is absorbed by the bellows 13a which spring constant is small and, as in the first embodiment, a stable coupling can be retained against the fluctuating temperature.

What is claimed is:

1. A laser diode module comprising:
   a hermetic package having opposed first and second ends, with said first end being disposed in front of said second end;
   a common base fixed within said package;
   a laser diode chip and a lens both disposed within said package and both operatively mounted on said common base;
   an optical fiber having a coupling end optically coupled through said lens to said chip;
   ferrule means for said optical fiber extending from said coupling end rearward out of said package through an aperture in said second end;
   first seal means hermetically sealing said ferrule means to said second end at said aperture, with said ferrule means having its rear end disposed outside of said package and extending rearward of said first seal means, said first seal means including a first support for said ferrule;
   a second support for said ferrule means operatively securing same at its front end to said base;
   said ferrule means being supported on said package solely at said first and second supports; and
   a bellows operatively secured to said ferrule means and being operatively positioned between those locations at which said first and second supports engage said ferrule means.

2. The laser diode module according to claim 1 wherein said second support comprises a slide ring encircling said ferrule means and supported by said common base fixed to said package.

3. The laser diode module according to claim 2 wherein said ferrule means is divided into first and second portions, one end of said first portion is supported by said slide ring and the other end of said first portion is fixed to one end of said bellows, one end of said second portion is fixed to said bellows at its other end, and the other end of said second portion is fixed to said package.

4. The laser diode module according to claim 1 wherein said bellows is an electroplated bellows formed of a multilayer film consisting of Au, Ni and Cu.

5. The laser diode module according to claim 1 wherein said bellows is an electroplated bellows formed of a single Ni layer.

6. The laser diode module as defined in claim 1 wherein said bellows has a spring constant of 0.1 kg/mm or less.

7. The laser diode module according to claim 1 wherein spacing between the lens and the optical fiber is substantially greater than spacing between the lens and the laser diode chip.

8. A laser diode module comprising:
   a hermetic package accommodating a laser diode chip therein;
   an optical fiber having one end optically coupled to said laser diode chip within said hermetic package through a lens disposed therebetween;
   a common base supporting said laser diode chip and said lens;
   said optical fiber having its other end led out from said hermetic package through a hermetic sealing portion;
   a ferrule provided at said one end of said optical fiber being fixed to said base such that said laser diode chip is adjusted along an optical axis relative to said ferrule via said lens, the other end of said ferrule being led out from said hermetic package; and
   a bellows having one end fixed hermetically to said other end of said ferrule to constitute said hermetic sealing portion, with the other end of said bellows being fixed hermetically to said hermetic package to make said hermetic sealing portion.

9. The laser diode module according to claim 8 wherein spacing between the lens and the optical fiber is substantially greater than spacing between the lens and the laser diode chip.

10. A laser diode module comprising:
    a hermetic package accommodating a laser diode chip therein;
    an optical fiber having one end optically coupled to said laser diode chip within said hermetic package through a lens disposed between said one end and said laser diode chip;
    a common base fixed in said package supporting said laser diode chip and said lens within;
    the other end of said optical fiber being to the rear of said one end and being led out from said hermetic package through a hermetic sealing portion;
    aligned first and second ferrule sections;
    said first ferrule section being disposed at said one end of said optical fiber, one end of said first ferrule section being fixed to said base such that said laser diode chip is adjusted along an optical axis relative to said ferrule via said lens;
    a bellows having one end fixed to the other end of said first ferrule section;
    said second ferrule section having one end thereof fixed to the other end of said bellows, with the other end of said second ferrule section being fixed hermetically to said hermetic package to make said hermetic sealing portion.

11. The laser diode module according to claim 10 wherein spacing between the lens and the optical fiber is substantially greater than spacing between the lens and the laser diode chip.

* * * * *